(12) United States Patent
Parnas

(10) Patent No.: US 11,882,819 B2
(45) Date of Patent: Jan. 30, 2024

(54) FISHING ROD HOLDER FOR WASH-DOWN OF RODS AND REELS

(71) Applicant: Keith Parnas, Pompano Beach, FL (US)

(72) Inventor: Keith Parnas, Pompano Beach, FL (US)

( * ) Notice: Subject to any disclaimer, the term of this patent is extended or adjusted under 35 U.S.C. 154(b) by 20 days.

(21) Appl. No.: 17/490,984

(22) Filed: Sep. 30, 2021

(65) Prior Publication Data
US 2022/0095601 A1    Mar. 31, 2022

Related U.S. Application Data

(60) Provisional application No. 63/085,615, filed on Sep. 30, 2020.

(51) Int. Cl.
*A01K 97/10* (2006.01)
*A47B 81/00* (2006.01)

(52) U.S. Cl.
CPC ............ *A01K 97/10* (2013.01); *A47B 81/005* (2013.01)

(58) Field of Classification Search
CPC .............................. A01K 97/10; A47B 81/005
USPC ................. 211/60.1, 62, 70.8; 248/512, 513; 43/21.2
See application file for complete search history.

(56) References Cited

U.S. PATENT DOCUMENTS

| | | | | |
|---|---|---|---|---|
| 1,912,847 A * | 6/1933 | Klepel | ..................... | B62B 3/003 206/509 |
| 2,896,815 A * | 7/1959 | Longan | .............. | B65D 71/0003 206/202 |
| 3,045,863 A * | 7/1962 | De Chelbor | ....... | B65D 71/0003 206/203 |
| 3,349,958 A * | 10/1967 | Breneman | .......... | B65D 71/0003 206/201 |
| D237,686 S * | 11/1975 | Torokvei | ........................ | D3/309 |
| 3,991,879 A * | 11/1976 | Hirota | .................... | B65D 1/243 206/203 |
| 4,154,274 A * | 5/1979 | Adamson | ............... | A63B 55/10 294/159 |
| 4,204,617 A * | 5/1980 | Hirota | .................... | B65D 1/243 206/510 |
| 4,311,262 A * | 1/1982 | Morin | .................... | A01K 97/10 206/443 |
| 4,527,349 A * | 7/1985 | Emory, Jr. | ............. | A01K 97/10 248/513 |
| 5,005,847 A * | 4/1991 | King | ..................... | A01K 97/00 D3/315 |

(Continued)

OTHER PUBLICATIONS

Bass Pro Shops, "Fishing Rod Container Caddy", downloaded at: https://www.basspro.com/shop/en/fishing-rod-retainer-caddy?hvarAID=shopping_googleproductextensions&ds_e=GOOGLE&ds_c=Shop%7CBPS%7CTopPerformers%7CFishing&gclid=CjwKCAjwieuGBhAsEiwA1Ly_nWGI5_Tu13N2zPhIYE6kzh0kZ-ZCd25vs8RNTGQAuKy0fdqGzri_0hoCR4gQAvD_BwE&gclsrc=aw.ds, Jun. 29, 2021.

*Primary Examiner* — Kimberly T Wood
(74) *Attorney, Agent, or Firm* — The Concept Law Group, PA; Scott D. Smiley; Scott M. Garrett

(57) ABSTRACT

A fishing rod wash-down station is configured to hold a plurality of fishing rods during wash-down, and also to carry the rods to/from a vehicle and/or a storage location. The station includes a frame on which there are a plurality of vertical rod holder mounted. The rod holders allow water to pass through them so that they do not accumulate water while the rods are being washed down. The station is portable, or mobile, and can be configured to orient big game rods in a common orientation for transport and storage.

13 Claims, 16 Drawing Sheets

(56) References Cited

U.S. PATENT DOCUMENTS

| | | | | |
|---|---|---|---|---|
| 5,566,960 A | * | 10/1996 | McCrory | B62B 3/10 |
| | | | | 280/47.35 |
| 5,573,122 A | * | 11/1996 | Williams | A63B 55/40 |
| | | | | 206/315.6 |
| D405,006 S | * | 2/1999 | Spencer | D9/753 |
| 5,904,281 A | * | 5/1999 | Mooers | B60R 9/08 |
| | | | | 224/525 |
| 6,405,478 B1 | | 6/2002 | Westley | A01K 97/10 |
| | | | | 43/54.1 |
| 6,533,260 B1 | * | 3/2003 | Mock | A61G 7/08 |
| | | | | 254/133 R |
| 6,658,786 B1 | * | 12/2003 | Williams | A01K 97/10 |
| | | | | 43/54.1 |
| 6,883,268 B2 | | 4/2005 | Fraser | |
| 7,210,545 B1 | * | 5/2007 | Waid | B62B 3/12 |
| | | | | 180/19.1 |
| 7,588,277 B2 | * | 9/2009 | Crown | B25H 3/00 |
| | | | | 294/146 |
| 7,594,353 B2 | | 9/2009 | Lucky | |
| D661,451 S | * | 6/2012 | Armstrong, Sr. | D34/17 |
| 8,746,377 B1 | * | 6/2014 | Dunbar | B62B 5/0003 |
| | | | | 280/30 |
| 8,783,748 B1 | * | 7/2014 | Quinn | A01K 97/08 |
| | | | | 294/159 |
| 9,137,981 B1 | * | 9/2015 | Groves, Jr. | A01K 97/08 |
| D749,872 S | * | 2/2016 | Gonzalez | D6/552 |
| 9,415,786 B1 | * | 8/2016 | Lorrigan | B62B 1/206 |
| 9,615,661 B1 | * | 4/2017 | Hildebrand | A47B 47/00 |
| 9,861,087 B1 | * | 1/2018 | Arrazola | B62B 3/005 |
| 9,986,827 B1 | | 6/2018 | Long | |
| 10,058,086 B1 | * | 8/2018 | Mooney | A01K 97/01 |
| 10,149,537 B2 | | 12/2018 | Johnson | |
| 10,568,312 B2 | * | 2/2020 | McPherson | B65D 81/3216 |
| 10,624,454 B1 | * | 4/2020 | Kreinest | B62B 3/04 |
| 10,568,313 B2 | | 5/2020 | Erdmann | |
| D951,809 S | * | 5/2022 | Nelson | D11/155 |
| 2002/0070517 A1 | * | 6/2002 | Ramsey | B62B 5/06 |
| | | | | 280/47.35 |
| 2012/0110889 A1 | | 5/2012 | DeSpiegelaere et al. | |
| 2014/0125075 A1 | * | 5/2014 | Xiques | A01K 97/08 |
| | | | | 294/143 |
| 2014/0346206 A1 | * | 11/2014 | McKnight | A01K 97/08 |
| | | | | 224/404 |

\* cited by examiner

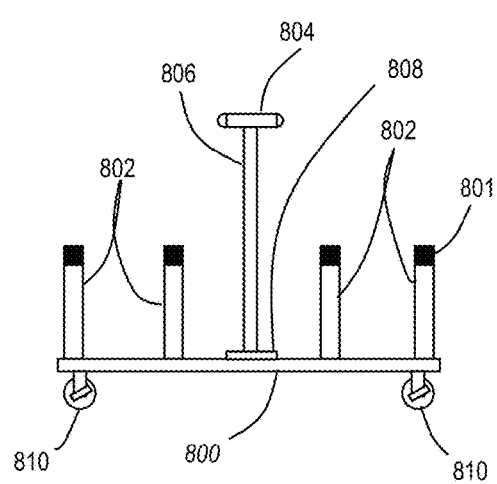 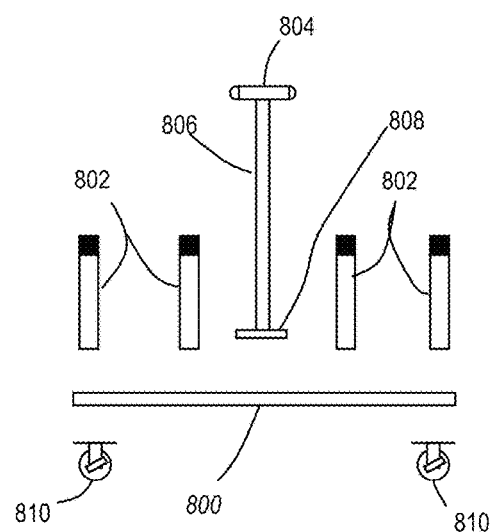
*FIG. 8A*  *FIG. 8B*

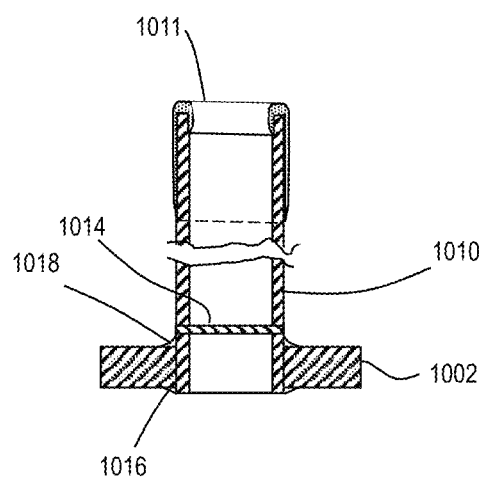 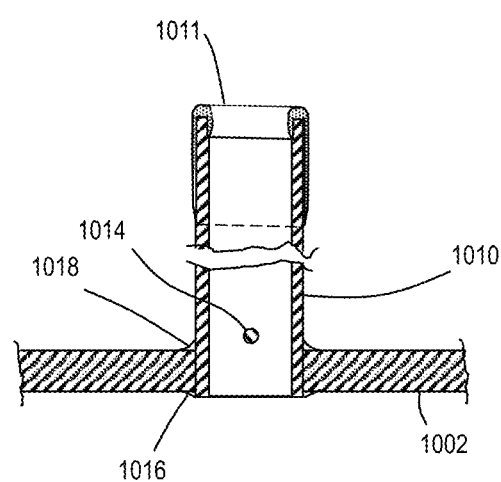
*FIG. 12A*          *FIG. 12B*

FISHING ROD HOLDER FOR WASH-DOWN OF RODS AND REELS

CROSS REFERENCE

This application claims the benefit of U.S. Provisional App. No. 63/085,615, filed Sep. 30, 2020, the entirety of which is hereby incorporated by reference.

FIELD OF THE INVENTION

The present invention relates generally to fishing rod holders, and, more particularly, relates to a fishing rod holder specifically configured for holding rods and reels for wash down with fresh water after use.

BACKGROUND OF THE INVENTION

Fishing is a popular activity enjoyed by many people around the world. Very commonly, and particularly for sport fishing, people use a rod and reel for fishing. Further, in coastal areas, a lot of fishing is done in saltwater. Many people who enjoy the sport will spend considerable money for durable fishing rods, reels, and associated equipment. To maintain this gear, it is necessary to wash off salt residue in order to prevent corrosion of the metal or damage to fishing line that can be caused by salt crystals.

Typically upon getting back to land, or when done fishing, a person will hose off their fishing gear with fresh water to get rid of the salt. A person could lay their rods (with the reels) on the ground (or dock) and simply spray them with fresh water. However, this can result in the rod being scratched, or potentially stepped on. High end fishing rods and reels can cost thousands of dollars, so laying the rod and reel on the ground is not a desirable option. To avoid placing the rod and reel on the ground a person can hold a given rod upright with one hand and use their other hand to operate a hose to spray down the rod/reel, but then this necessitates washing each rod individually, which is time consuming. Further, a person could lose grip on the rod, allowing it to fall onto the ground.

Some portable racks have been made using common PVC pipe material. These racks can hold several rods at a time. However, the closed tubing is not ideal for wash down as water can collect inside the tubing. Further, the material is relatively light, which allows the rack to move. It has also be found that over time and with exposure to sunlight that plastics like PVC can become brittle and break, or warp into unusable shapes. A typical PVC rod holder is simply a section of PVC pipe that is fixed or attached to something else. The butt of the rod will pass through the PVC section until the reel meets the top of the PVC section. Depending on the reel design, this may not be desirable as the edge of the PVC section may contact the fishing line wound on the reel and abrade or nick the line, creating a weakness in the line.

Therefore, a need exists to overcome the problems with the prior art as discussed above.

SUMMARY OF THE INVENTIVE DISCLOSURE

In accordance with some embodiments of the inventive disclosure, there is provided a fishing rod holder and wash-down station that includes a plurality of vertical rod holders arranged in a first row and a second row. The first row being positioned on a first side of a lower support member, and the second row being positioned on a second side of the lower support member that is opposite the first side. Each of the first row and the second row are spaced apart from, and parallel to the lower support member. The station further includes a plurality of horizontal joining members, where each joining member is coupled between a respective one of the plurality of vertical rod holders and the lower support members. The station further includes a handle that is positioned over, and joined to, the lower support member by at least one vertical joining member. The station further includes each one of the plurality of vertical rod holders having a foot member over a bottom of the vertical rod holder and a cap over a top, each cap having an opening to allow insertion of a handle end of a fishing rod into the respective vertical rod holder. The plurality of vertical rod holders, lower support member, plurality of horizontal joining members are made of metal tube stock. The plurality of bottoms of the plurality of vertical rod holders are all substantially level with each other and are configured to rest on a surface to support the fishing rod holder and wash-down station on the surface.

In accordance with a further feature, the at least one vertical joining member comprises a first vertical joining member and a second vertical joining member, wherein the first vertical joining member is positioned between the lower support member and the handle from a first end of the lower support member to a first end of the handle, and the second vertical joining member is positioned between the lower support member and the handle from a second end of the lower support member to a second end of the handle, wherein the handle is positioned directly over the lower support member.

In accordance with a further feature, the station further includes a first end vertical rod holder coupled to the first vertical joining member, a second end vertical rod holder coupled to the second vertical joining member, and wherein the first end vertical rod holder and the second end vertical rod holder each have a bottom that is higher than the bottom of each one of the plurality of vertical rod holders.

In accordance with some embodiments of the inventive disclosure, there is provided a fishing rod holder and wash-down station that includes a frame having frame members arranged in a rectangle having two parallel long sides and two opposing parallel short sides at ends of the long sides. The station also incudes a plurality of vertical rod holders disposed in the frame such that a bottom end of each one of the plurality of vertical rod holders pass through the frame from a top of the frame to a bottom of the frame, and wherein each of the vertical rod holders are open at a top end and a bottom end. Each one of the vertical rod holders having a horizontally oriented stop post at a lower end of the vertical rod holder, and wherein the stop posts in each one of the vertical rod holders have a common orientation with each other. The station further having a cross member between the parallel long sides of the frame, and a handle mounted on the cross member including a vertical shaft that extends upward from the cross member, and a hand rest at a top of the vertical shaft having an elongated body that is oriented to be parallel to the long side of the frame. The station further having a plurality of casters, each one of the casters being disposed at a respective corner of the frame.

In accordance with a further feature, the vertical rod holders are each made of an metal tube, and wherein each one of the vertical rod holders includes a cap over a top edge of the vertical rod holder that covers a portion of an inside surface and a portion of an outside surface of the vertical rod holder.

In accordance with a further feature, the cap on each vertical rod holder is made of vinyl.

In accordance with a further feature, each of the frame members have a top surface and bottom surface that that are wider than a vertical height of the frame members.

In accordance with a further feature, each of the frame members are aluminum planks.

In accordance with a further feature, the stop posts are all oriented to be perpendicular to the elongated direction of the long side frame members.

In accordance with a further feature, each of the frame members and plurality of vertical rod holders are made of powder coated aluminum.

In accordance with a further feature, at least one of the wheels includes a brake.

In accordance with a further feature, the plurality of vertical rod holders are arranged in first line along a first one of the long side frame members, and in a second line along a second one of the long side frame member.

In accordance with a further feature, the vertical rod holders are spaced at least six inches apart.

Although the invention is illustrated and described herein as embodied in a fishing rod holder and wash-down station, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail," "vertical," "horizontal" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 8A shows a side elevational view of a mobile rod holder wash-down station, in accordance with some embodiments;

FIG. 8B shows a side exploded vide of a mobile rod holder wash-down station, in accordance with some embodiments;

FIG. 12A shows a side cross sectional view of a portion of a frame and vertical rod holder, taken through the vertical center of the vertical rod holder, of a mobile rod holder wash-down station, in accordance with some embodiments;

FIG. 12B shows a side cross sectional view of a portion of a frame and vertical rod holder, taken through the vertical center of the vertical rod holder, of a mobile rod holder wash-down station, in accordance with some embodiments;

DETAILED DESCRIPTION

Figure 1:
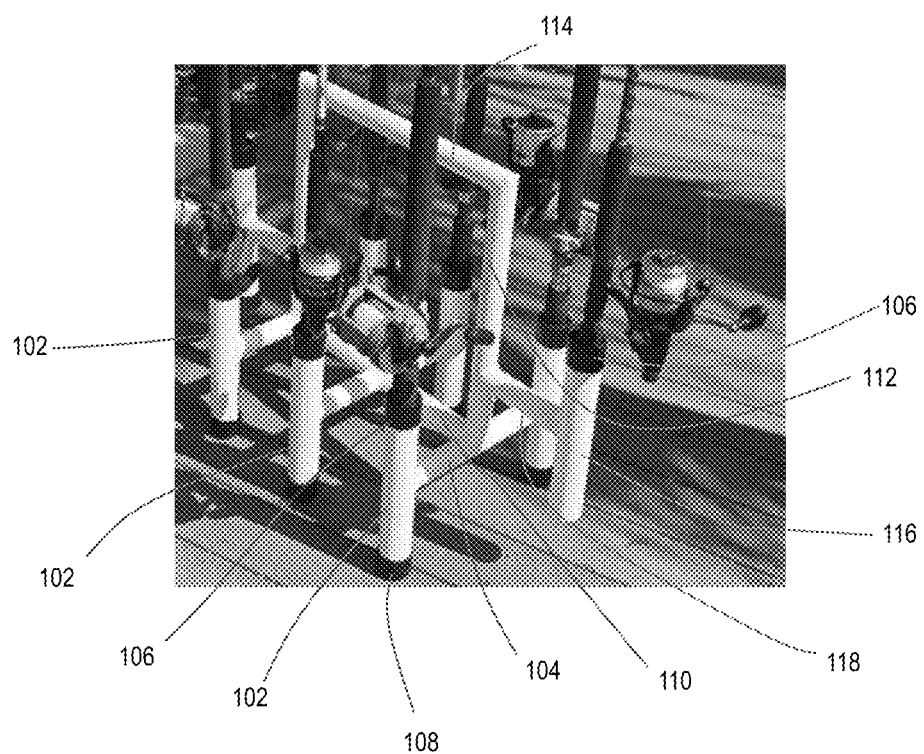
FIG. 1 is a perspective view of a fishing rod holder and wash-down station, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
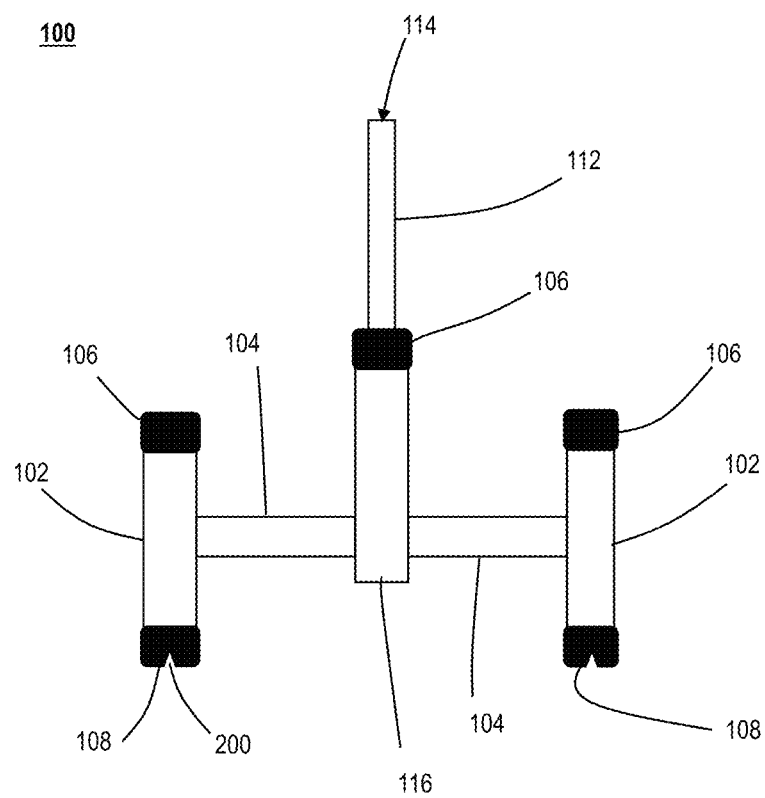
FIG. 2 is a side view of the fishing rod holder and wash-down station, in accordance with some embodiments.
Figure 3:
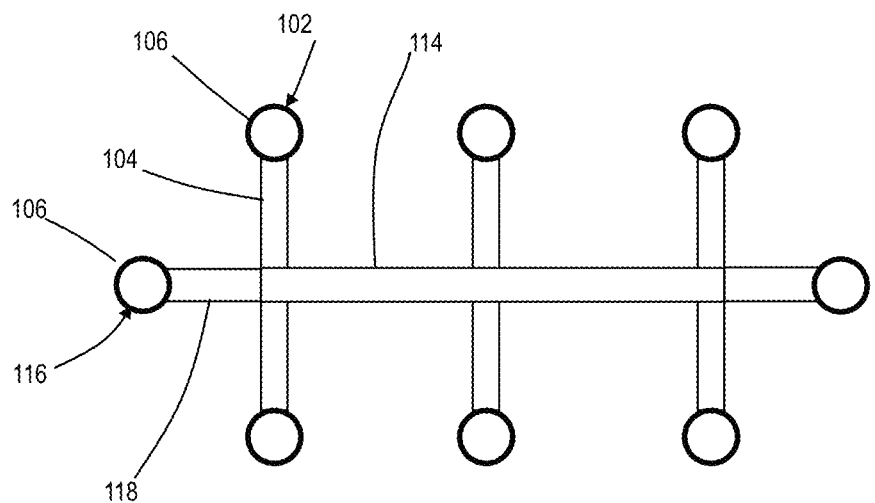
FIG. 3 is a top view of the fishing rod holder and wash-down station, in accordance with some embodiments.

FIG. 1 is a perspective view of a fishing rod holder and wash-down station 100, in accordance with some embodiments. FIGS. 2-3 show a side/end view, and a top view, respectively, of the station 100 without any fishing rods. In general, the wash-down station can hold several fishing rods in an upright, vertical orientation so that they can be sprayed with fresh water to wash away salt and debris. The configuration and construction of the station is such that it will stay in place during the spraying, even when relatively high pressure/volume of water is being used. Further, the station will resist tipping, and even when empty (e.g. not holding any fishing rods) is sufficiently massive to resist being blown or knocked over. In addition, the station 100 provides a convenient means of carrying and storing the fishing rods after being washed down.

The station includes a plurality of vertical rod holders 102 which are tubular members in which the handle of a fishing rod can be inserted to hold the fishing rod upright, vertically, meaning the axis of the fishing rod is vertically oriented. The vertical rod holders 102 are each connected to a lower support member 110 that is oriented horizontally. The vertical rod holders 102 can be organized in rows on each side of the lower support member 110, and are joined to the lower support member by a respective horizontal joining member 104.

Figure 5:
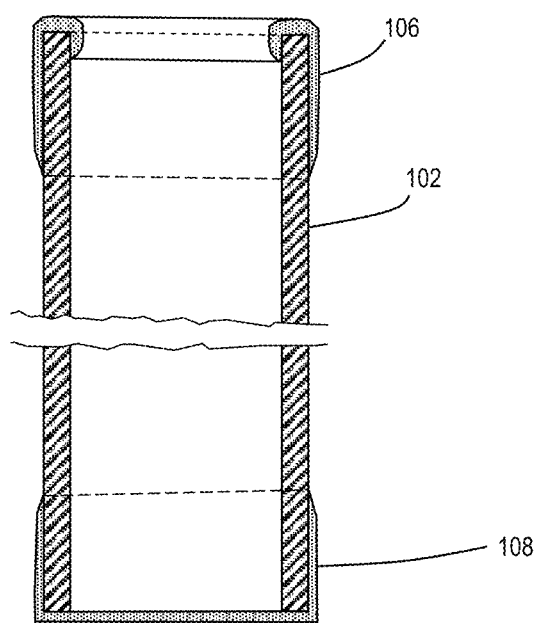
FIG. 5 is a cutaway view of a vertical rod holder with a cap and foot member, in accordance with some embodiments.

Each vertical rod holder 102 has a bottom that can have a foot member 108, and a top over which a cap 106 is placed. The foot members 108 and caps 106 can be a compliant material that prevents scratching of the fishing rod or the surface on which the station 100 is placed. In some embodiments the caps 106 and foot members 108 can be made of a rubber or similar polymeric material and are tubular, having an outer wall and an inner wall between which an end of the one of the vertical rod holders is fit. Thus, the caps 106 provide a compliant barrier between the rod and the edge of the vertical rod holder 102 at the top opening of the vertical rod holder 102. FIG. 5 shows a side cut-away view of a vertical rod holder 102 with a cap 106 and a foot member 108 installed on the top and bottom, respectively, of the vertical rod holder 102. The view is sectioned to show the top and bottom portions of the vertical rod holder 102. The cap 106 is open at the top to allow the handle of a fishing rod to be inserted into the vertical rod holder 102. The cap 106 can have a portion that extends over the top edge of the vertical rod holder 102, and down the inside wall of the vertical rod holder 102. The foot member 108 can cover the bottom, or be shaped like the cap 106 to allow water to exit the vertical rod holder 102. Thus, the cap 102 and foot member 108 are configured to fit over an end of the vertical rod holder 102 and be retained by friction between the surface of the vertical rod holder 102 and the surfaces of the cap/foot member 106, 108 that are in contact with the surface of the vertical rod holder 102.

Figure 4:
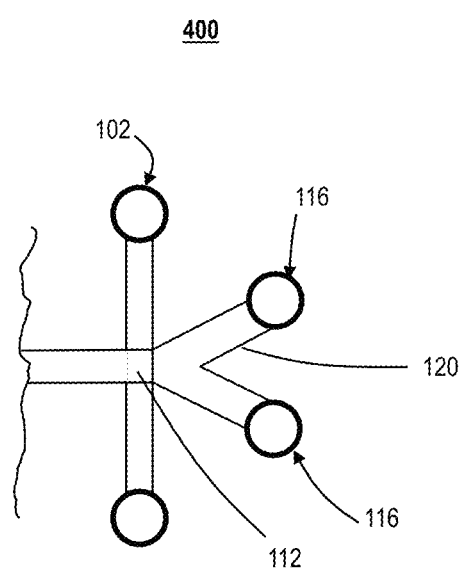
FIG. 4 is a top view detail of an alternate arrangement of a fishing rod holder and wash-down station, in accordance with some embodiments.

A handle 114 can be joined to the lower support member 110 by one or more vertical joining members such as vertical joining member 112. In some embodiments there can be two vertical joining members 112 located at each end of the lower support member 110 such that the handle 114 is directly over the lower support member 110. Additional vertical rod holders 116 can be coupled to the vertical joining members 112 using horizontal joining members 118. The vertical rod holders 116 on the ends of the station 110 are elevated from the surface to allow a person's foot to pass under them, preventing people from tripping. Similarly, the horizontal joining members 104 and lower support member 110 can likewise be elevated from the ground by several inches. The vertical rod holders 102, joining members 104, 112, 118, lower support member 110, and handle 114 can all be made of metal tubing that is welded together and then powder coated for weather and salt resistance. FIG. 4 is a top view detail of an alternate arrangement of a fishing rod holder and wash-down station, in accordance with some embodiments. In such embodiments there are multiple end rod holders 116 which can be joined to the vertical joining member 112 using a "Y" configuration in a horizontal plane, for example.

Figure 6:
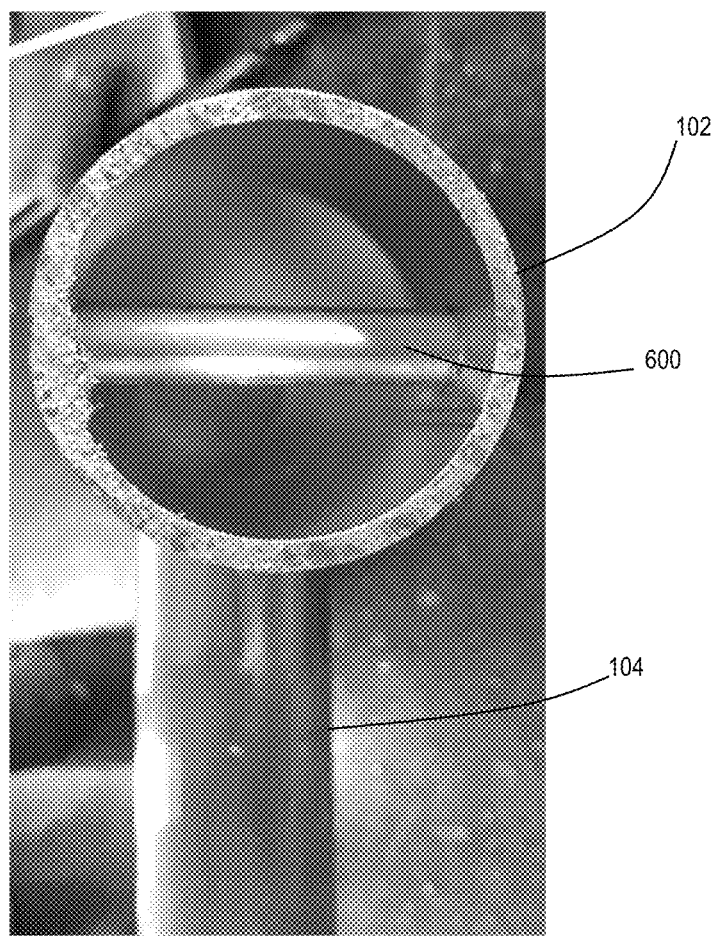
FIG. 6 shows a top view of a rod holding including a rod stopping feature, in accordance with some embodiments.

FIG. 6 shows a top view of a vertical rod holder 102 in which a rod stopping feature 600 is included. The rod stopping feature 600 prevents a fishing rod from going past the rod stopping feature upon the handle of the rod being inserted in the rod holder 102. The rod stopping feature 600 can be a post rod through the center of the rod holder as shown. The post can be configured to engage a correspondingly-shaped slot formed in the butt of deep-sea fishing rods that are designed to engage a similar post that is mounted in a fishing harness. The post 600 is positioned, vertically, in the vertical rod holder 102 so as to allow a substantial portion of the butt of a fishing rod to sit within the vertical rod holder, and thereby hold the fishing rod sufficiently to keep it from falling out of the vertical rod holder 102. In some embodiments the vertical rod holder 102 can have a diameter of about two inches, and a height from bottom to top of about eight to twelve inches. The post 600 can be located near the bottom of the vertical rod holder 102.

Figure 7:
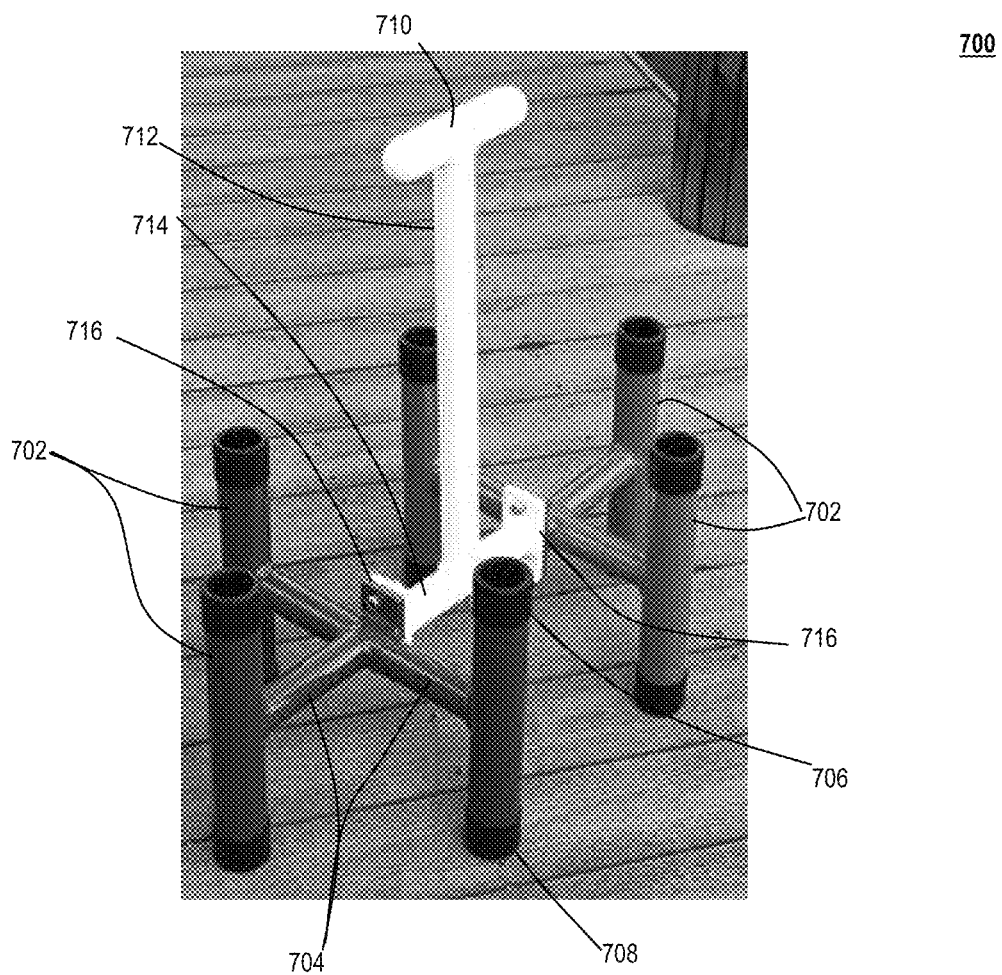
FIG. 7 shows an alternative configuration of a rod holder wash-down station, in accordance with some embodiments.

FIG. 7 shows a perspective view of a fishing rod holder and wash-down station that can be assembled, meaning it can be packaged and sold in an unassembled state, and then assembled by the end customer. A center section includes a handle 710 coupled to a vertical joining member 712 at a top end of the vertical joining member 712. A bottom end of the vertical joining member is attached to a horizontal support member 714. The ends of the horizontal support member each include a vertically oriented plates 716 that mates with a corresponding plate of a rod holder section. The plates can be coupled together using fasteners such as, for example, bolts. Each rod holder section includes two or more vertical rod holders 702 that are coupled together with horizontal joining members 704. Each rod holder 702 includes a cap 706 at the top of the rod holder, and a foot member 708 at the bottom of the rod holder. By making the section separately, the station can be broken down into a smaller space for shipping or storage. Also, the various sections can be made in different colors, allowing the assembly of sections in a person's favorite colors, such as, for example, colors used by a favorite sports team. In other embodiments the various sections can be configured to be assembled/disassembled quickly, such as by using snap fittings, interfacing slotted joints, and so on.

In the foregoing embodiments the wash-down station, while portable in the fact that it has a handle and can be carried, it is contemplated that a more mobile/moveable platform is needed for heavy duty fishing rods and reels. There are fishing reels, for example, designed for very large game fish, that can weigh several dozen pounds or more as they can include motors. Place several of these reel/rod combinations in a portable wash-down station will make it difficult to carry. Accordingly a more mobile embodiment of the invention has also been developed as shown in the subsequently described drawings.

Figure 9:
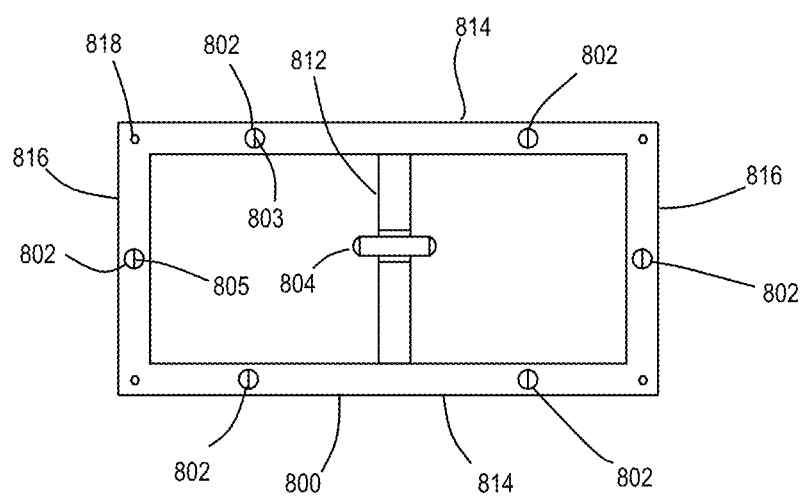
FIG. 9 shows a top plan view of a mobile rod holder wash-down station, in accordance with some embodiments.

FIGS. 8A & 8B show a side elevational view and a side exploded view of a mobile rod holder wash-down station, in accordance with some embodiments. FIG. 9 shows a top plan view of a mobile rod holder wash-down station as shown in FIGS. 8A & 8B. The mobile rod holder wash-down station includes a frame 800 that has several horizontal frame members, such as, for example a first pair of parallel members 814, and a second pair of parallel side member 816 located at opposite ends of the first pair of parallel side members 814. As such, the arrangement of the side members 814, 816 can be a square or rectangle. In some embodiments side members 814 can be longer than side members 816. The frame members 814, 816, and center cross member 812, can be made of a stock that is substantially wider (in the horizontal direction) than it is tall (in the vertical direction). In some embodiments the frame member 812, 814, 816 can be made of aluminum struts having a 1"×3" nominal measurement (height to width).

Mounted at various positions on the frame members 814, 816 are a plurality of vertical rod holders 802. Each one of the vertical rod holders is a tube that extends vertically upwards from the frame member 814, 816 in which it is mounted. To install the vertical rod holders 802, an opening is formed through the frame member at the desired location for the vertical rod holder 802 that is slightly larger than the outer dimension (e.g. diameter) of the vertical rod holder 802. In this way the bottom of the vertical rod holder 802 can be passed through the opening, and then secured to the frame member, such as by glue or welding. In some embodiments the vertical rod holders 802 are aluminum tubing sections having a nominal diameter of two inches, and are welded to the frame members at the top and bottom of the frame members around the vertical rod holder 802. A cap 801 can be placed over the top end of the each of the vertical rod holders to cover the material of the vertical rod holders 802. The cap 801 extend around the outside and inside surfaces and is made of a softer material, such as vinyl or rubber, to protect the fishing rods when seated in the vertical rod holder 802.

The vertical rod holders 802 can have a minimum spacing of six to twelve inches between them to ensure adequate spacing between the fishing rods when being washed. Wash-down stations designed to accommodate larger, deep water or big game fishing rod/reels will require larger distances (e.g. twelve inches) between the vertical rod holders 802, while smaller rod/reels can be more closely spaced. Further, in each vertical rod holder 802 there is a cross mounted stop post 803 at the lower end of the vertical rod holder 802. The stop post 803 is simply a horizontally mounted post against which the butt of a fishing rod will rest when inserted into the vertical rod holder. The stop posts 803, 805 in each of the vertical rod holders 802 can be commonly oriented as shown, in a direction that is perpendicular to the elongated direction of the longer frame members 814. This will allow orientation of certain fishing rods in the vertical rod holders to minimize the outward reach of the fishing rods. The stop posts 803, 805 can be located a minimum distance from the top of the vertical rod holder 802 of six inches. However, the vertical rod holders 802 will be on the order of six to twelve inches in length, from top to bottom, and the stop post 803, 805 will generally be close to the bottom of the vertical rod holder 802. Further, the bottom of each vertical rod holder 802 is open so as to allow water to pass directly through it and the frame member in which it is mounted.

In addition to the outer frame member 814, 816, there can be a central cross member 812 on which a handle is attached. The handle includes a vertical shaft 806 own which there is mounted a hand rest 804 at its top distal end. The vertical shaft 806 can be joined to a mounting plate 808 at its bottom end to allow fastening of the handle to the central cross member, such as with bolts. The vertical shaft 806 and hand rest 804 can comprise sections of tubing of a size used to fabricate the vertical rod holders 802. The frame members 812, 814, 816, vertical rod holders 802, and handle elements 804, 806 can all powder coated to further protect them from corrosion. A set of wheels 810, which can be casters having a brake lever, can be mounted at the corners of the frame 800. Thus, by pushing on the hand rest 804, a user can move the mobile rod holder wash-down station and it will roll on the wheels 810. This can allow a user to push the mobile rod wash-down station from a location (e.g. vehicle, garage, shed, etc.) to the dock where a boat is moored, then transfer the fishing rods from the mobile rod holder wash-down station to the boat. Upon returning to the dock, the fishing rods can then be transferred from the boat to the mobile rod wash-down station, and then sprayed down with fresh water to remove salt and debris. Once the fishing rods have been sufficiently rinsed, the mobile rod wash-down station can be rolled back to a vehicle for transport or to a storage location.

Figure 10:
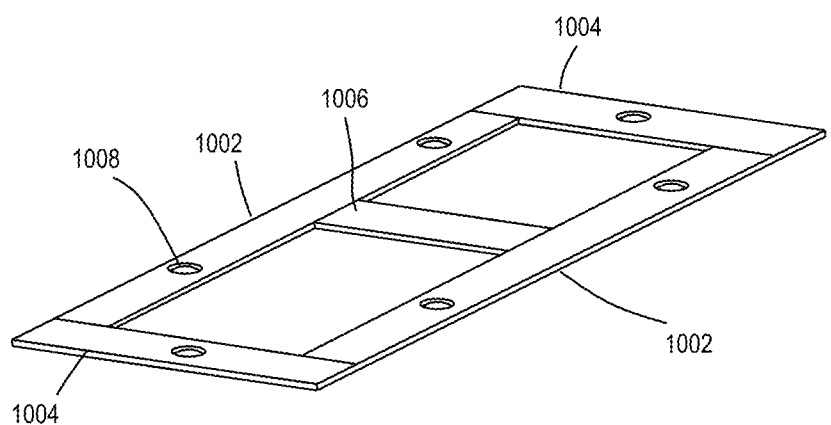
FIG. 10 shows a perspective view of a frame for a mobile rod holder wash-down station, in accordance with some embodiments.
Figure 11:
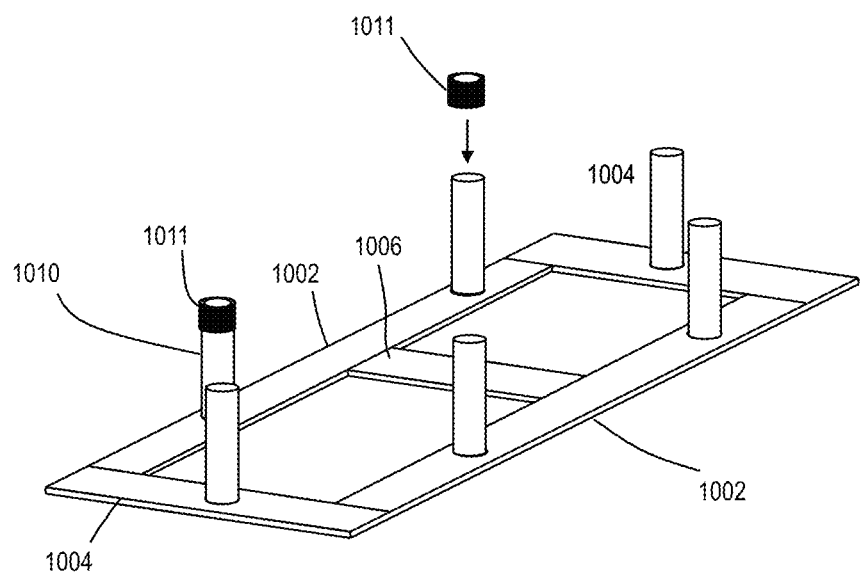
FIG. 11 shows a perspective view of a frame with vertical rod holders for a mobile rod holder wash-down station, in accordance with some embodiments.

FIG. 10 shows a perspective view of a frame 100 for a mobile rod holder wash-down station, in accordance with some embodiments. The frame 1000 include a pair of long side frame members 1002 and a pair of short side frame members 1004 arranged in a rectangular configuration. The frame members 1002, 1004 can be 1"×3" sections of aluminum having their major surfaces (i.e. the width) oriented horizontally. The frame members 1002, 1004 can be welded together at the corners of the frame 1000. A central cross member 1006, which can be comprised of the same stock used for the frame members 1002, 1004, is provided between the long side frame members 1002 for mounting a handle thereto. A plurality of openings 1008 are formed through the frame members 1002, 1004, in a vertical direction. The openings 1008 are spaced apart from each other at a minimum spacing of between six and twelve inches. In some embodiments the spacing is maintained between all of the openings 1008, and in some embodiments the spacing may vary to accommodate a mix of large and small rod/reel units. In FIG. 11 the vertical rod holders 1010 are shown installed in the openings 1008, and the caps 1011 are placed over the top ends of the vertical rod holders 1010.

FIGS. 12A and 12B each show a side cross sectional view of a portion of a frame 1002 and vertical rod holder 1010, taken through the vertical center of the vertical rod holder 1010, of a mobile rod holder wash-down station, in accordance with some embodiments. FIG. 12B is sectioned at a ninety degree angle to that of FIG. 12A. That is, FIG. 12 A is section perpendicular to the elongated direction of frame member 1002, and FIG. 12B is section parallel to the elongated direction of frame member 1002. In this view the vertical rod holder 1010 is broken in the middle so that the upper and lower ends are shown. A stop post 1014 extends across the inside of the vertical rod holder 1010. The cap 1011 can be seen on both the outside and inside of the vertical rod holder 1010 at the time, specifically covering the top edge of the vertical rod holder 1010. The cap can be glued on, or simply sized to fit snugly on the top of the vertical rod holder 1010 and be retained by friction. The vertical rod holder 1010 can be joined to the frame member 1002 such as by weld fillets 1016, 1018 at the bottom and top of the frame member 1002 around the vertical rod holder 1010.

Figure 13:
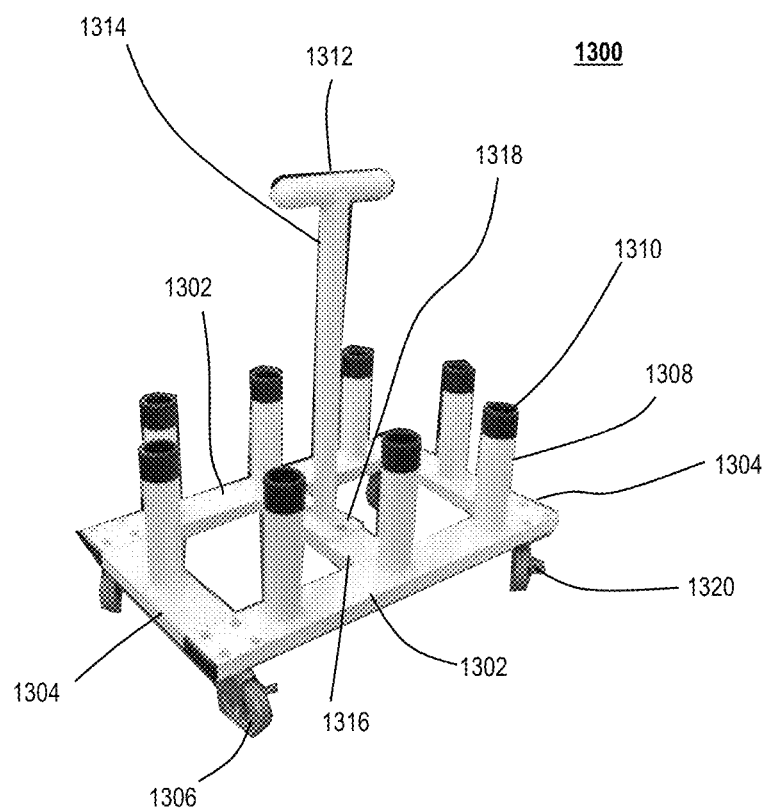
FIG. 13 shows a perspective view of a mobile rod holder wash-down station, in accordance with some embodiments.

FIG. 13 shows a perspective view of a mobile rod holder wash-down station 1300, in accordance with some embodiments. In the particular implementation shown, there is a rectangular frame comprised of long side frame members 1302 and short side frame members 1304, with a cross member 1316 between the long side frame members 1302. At each corner, on the bottom of the frame, there is a wheel 1306, which can have a brake lever 1302 that selectively allows or disallows rolling of the wheel. Mounted on the frame members 1302, 1304 are a plurality of vertical rod holders 1308, which are mounted in openings formed through the frame members 1302, 1304 so that the vertical rod holders are open at the bottom end. The vertical rod holders 1308 can have a minimum spacing of about eight inches, and each have a cap 1310 over their top edge. A handle is formed of a vertical shaft 1314 with a hand rest 1312 at its top in a "T" configuration, and with the hand rest 1312 having an elongated direction that is parallel to that of the long side frame members 1302 to facilitate walking alongside the mobile rod wash-down station when using the hand rest 1312 and handle to move the mobile rod wash-down station as it rolls on the wheels 1306. The frame members 1302, 1304 can be extended in length to accommodate more vertical rod holders 1308, or a larger minimum spacing between the vertical rod holders 1308, or both. Although given that the mobile rod wash-down station is intended to be moved using the handle, it is expected that extending the long side frame members 1302 is more preferable.

Figure 14:
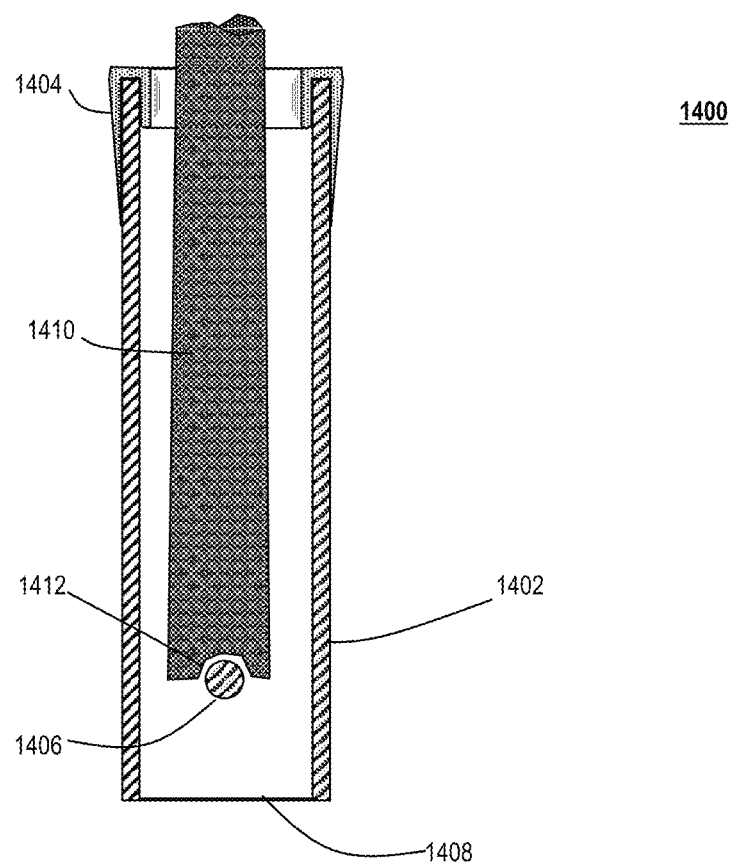
FIG. 14 shows a side cross sectional view of a vertical rod holder with the butt of a fishing rod inserted therein, in accordance with some embodiments.

FIG. 14 shows a side cross sectional view 1400 of a vertical rod holder 1402 with the butt 1410 of a fishing rod inserted therein, in accordance with some embodiments. The view here is a central vertical plane through the rod holder 1402. The butt 1410 includes a notch 1412 at the end of the butt 1410 that fits over the stop post 1406. This force the fishing rod into a particular orientation when the butt 1410 is inserted into the rod holder 1402. The fishing rod extends out of the top of the rod holder 1402, which is covered by a cap 1404 against which the side of the butt 1410 can rest without being scratched by the top edge of the rod holder 1402. As water is sprayed onto the fishing rod, some of the water will pass through the rod holder 1402, and exit through the bottom 1408 of the rod holder 1042, which is completely open and unobstructed to maximize water evacuation and air circulation to prevent any microbial growth on the butt 1410 of the fishing rod in storage. It should be assumed that the bottom end of the rod holder 1402 is mounted in an opening through a frame member as previously described.

Figure 15:
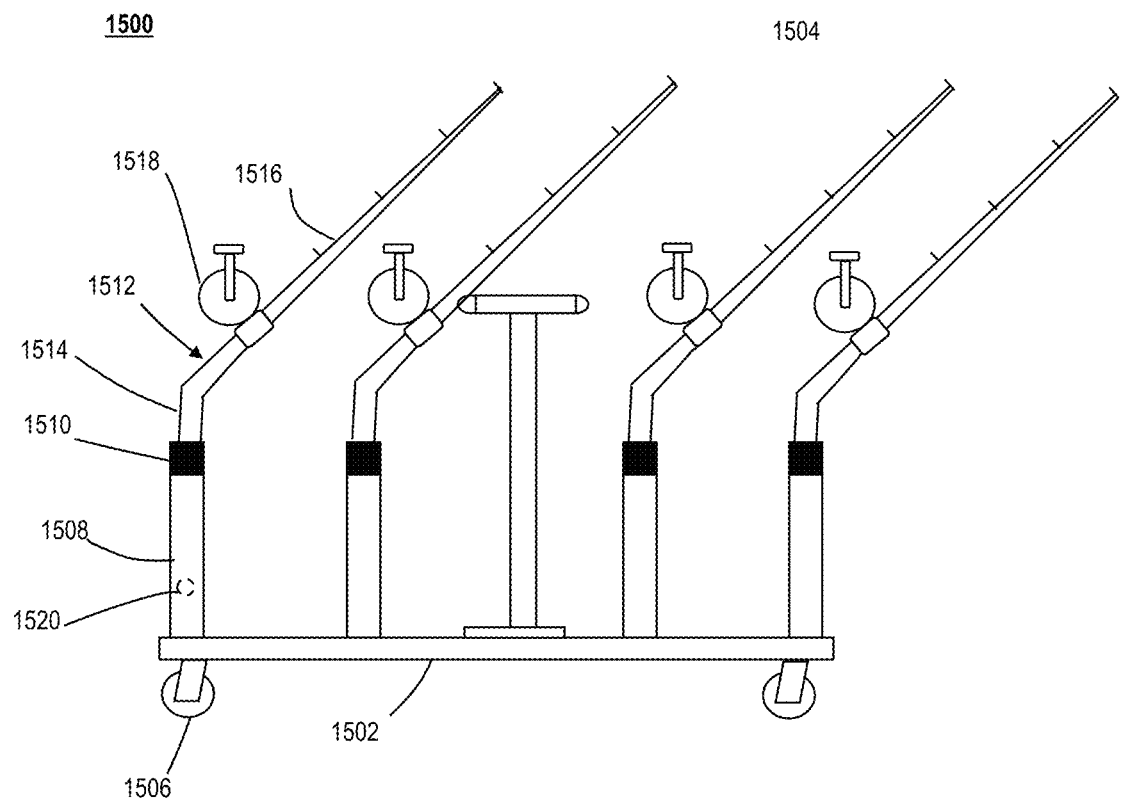
FIG. 15 shows a side elevational view of a mobile rod holder wash-down station in which several fishing rods are seated and commonly oriented, in accordance with some embodiments.

FIG. 15 shows a side elevational view of a mobile rod holder wash-down station 1500 in which several fishing rods are seated and commonly oriented, in accordance with some embodiments. The mobile rod wash-down station includes a frame 1502 and handle 1504, with wheels 1506 at the corners of the frame 1502, substantially as described previously. A plurality of vertical rod holders 1508 are provided on the frame 1502, each of which have a cap 1510 over their top edge. Seated in the vertical rod holders are fishing rods, such as fishing rod 1512, which is a deep sea or big game fishing rod having a butt section 1514 that is placed into the vertical rod holder 1508. The fishing rod 1512 is bent at an elbow and has the reel-mount section and line guide section 1516 at an angle to the butt 1514. The reel 1518 is mounted at the reel mount section between the butt 1514 and the line guide section 1516. The butt 1514 is configured substantially as shown in FIG. 14, where the butt 1410 has a notch 1412. The notch 1412 is designed to fit on a cross post in a socket provided on a fishing harness worn by an angler while fighting a fish. By arranging the stop post 1406 to be perpendicular to the elongated direction of the long side members of the frame 1502, the fishing rods can be commonly oriented as shown here. The position 1520 of a stop post is shown here, and the bottom of the butt 1514 will rest against the butt, with the stop post in the notch at the end of the butt 1514 in an arrangement similar to that shown in FIG. 14.

Figure 16:
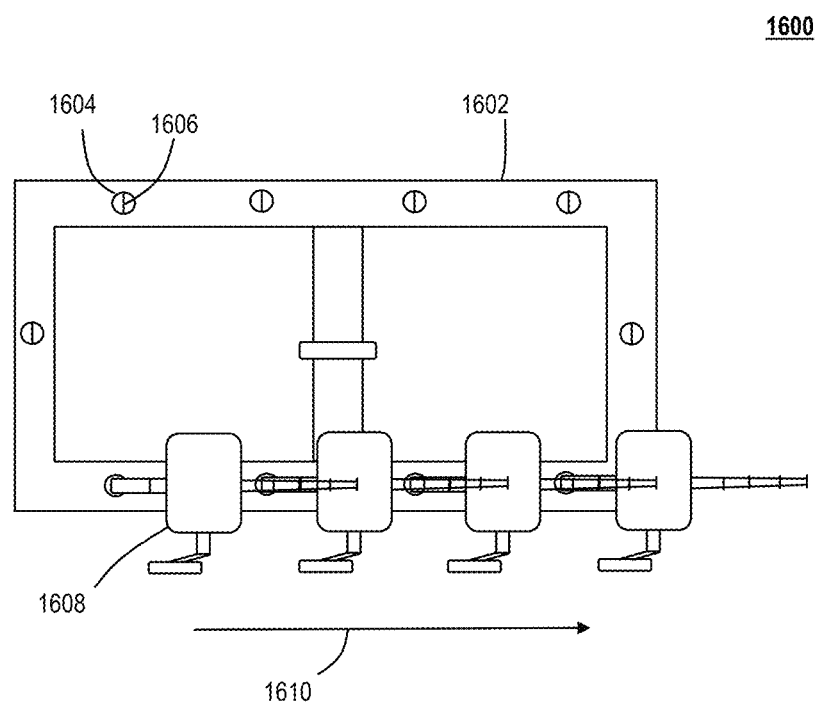
FIG. 16 shows a top view of a mobile rod holder wash-down station in which several fishing rods are seated and commonly oriented, in accordance with some embodiments.

FIG. 16 shows a top view of a mobile rod holder wash-down station 1600 in which several fishing rods are seated and commonly oriented, in accordance with some embodiments, in a configuration similar to that of FIG. 15. A frame 1602 supports a plurality of vertical rod holders 1604, which each have a stop post 1606 arranged in a direction that is perpendicular to the elongated direction of the long side of the frame 1602. This causes the fishing rods 1608 to orient a particular way (either angled to the rear or the front), rather than spinning around in an arbitrary direction. Thus, as shown here, a plurality of fishing rods can be commonly oriented such that their line guide sections all angle in the direction of arrow 1610. The stop post causes the rod to orient in this manner (or in the opposing direction) due to the notch in the end of the butt of the rod seating on the stop post. As a result, the rods tend to stay in the orientation shown, and won't, for example, angle outwards, which can prevent them from impacting against structure or getting caught on thing when being moved in the mobile rod wash-down station.

A rod holder and wash down station has been disclosed that allows a plurality of rods to be held for wash-down after use, and then carried or transported to storage in the station. The station is made of lightweight, strong, low corrosion materials, such as aluminum, to be durable. The configuration of the rod holders maximizes drainage and air flow by being completely open at both ends. A horizontal stop post in each rod holder ensure a rod cannot be lowered too far into the rod holder such that the reel on the rod contacts the rod holder. Further, the stop post can be oriented to that rods that use notched butts for big game fishing can be commonly oriented to protect the rods from damage due to incidental contact with things while moving the station with the rods in it.

What is claimed is:

1. A fishing rod holder and wash-down station, comprising:
a plurality of vertical rod holders arranged in a first row and a second row;
the first row positioned on a first side of a lower support member, the second row positioned on a second side of the lower support member that is opposite the first side, wherein each of the first row and the second row are spaced apart from, and parallel to the lower support member;
a plurality of horizontal joining members, each joining member coupled between a respective one of the plurality of vertical rod holders and the lower support member;
a handle that is positioned over, and joined to, the lower support member by at least one vertical joining member;
each one of the plurality of vertical rod holders having a foot member over a bottom of the vertical rod holder and a cap over a top, each cap having an opening to allow insertion of a handle end of a fishing rod into the respective vertical rod holder; and
wherein the plurality of vertical rod holders, lower support member, plurality of horizontal joining members are made of metal tube stock;
wherein the plurality of bottoms of the plurality of vertical rod holders are all substantially level with each other and are configured to rest on a surface to support the fishing rod holder and wash-down station on the surface.

2. The fishing rod holder and wash-down station of claim 1, wherein:
the at least one vertical joining member comprises a first vertical joining member and a second vertical joining member, wherein the first vertical joining member is positioned between the lower support member and the handle from a first end of the lower support member to a first end of the handle, and the second vertical joining member is positioned between the lower support member and the handle from a second end of the lower support member to a second end of the handle, wherein the handle is positioned directly over the lower support member.

3. The fishing rod holder and wash-down station of claim 2, further comprising:
a first end vertical rod holder coupled to the first vertical joining member;
a second end vertical rod holder coupled to the second vertical joining member; and
wherein the first end vertical rod holder and the second end vertical rod holder each have a bottom that is higher than the bottom of each one of the plurality of vertical rod holders.

4. A fishing rod holder and wash-down station, comprising:
a frame including frame members arranged in a rectangle having two long sides, each of the long sides having a length and being parallel to each other along their lengths, the frame further including two short sides that each have a length and which are parallel to each other along their lengths and perpendicular to the two long sides, a first one of the short sides being connected to, and between, the two long sides at a first end of the long sides and a second one of the short sides being connected to, and between, the two long sides at a second end of the long sides;
a plurality of vertical rod holders disposed in the frame such that a bottom end of each one of the plurality of vertical rod holders pass through one of the frame members from a top of the one of the frame members to a bottom of the one of the frame members, and wherein each of the vertical rod holders are open at a top end and a bottom end;
each one of the vertical rod holders having a horizontally oriented stop post at a lower end of the vertical rod holder, and wherein the stop posts in each one of the vertical rod holders have a common orientation with each other;
a cross member connected to, and between, each of the long sides of the frame and positioned centrally between the short sides;
a handle mounted on the cross member including a mounting plate coupled to the cross member and a vertical shaft that extends upward from the mounting plate, and a hand rest at a top of the vertical shaft having an elongated body that is oriented to be parallel to the long sides of the frame; and
a plurality of casters, each one of the casters being disposed at a respective corner of the frame.

5. The fishing rod holder and wash-down station of claim 4, wherein the vertical rod holders are each made of a metal tube, and wherein each one of the vertical rod holders includes a cap over a top edge of the vertical rod holder that covers a portion of an inside surface and a portion of an outside surface of the vertical rod holder.

6. The fishing rod holder and wash-down station of claim 5 wherein the cap on each vertical rod holder is made of vinyl.

7. The fishing rod holder and wash-down station of claim 4, wherein each of the frame members have a top surface and bottom surface that that are wider than a vertical height of the frame members.

8. The fishing rod holder and wash-down station of claim 7 wherein each of the frame members are aluminum planks.

9. The fishing rod holder and wash-down station of claim 4, wherein the stop posts are all oriented to be perpendicular to the elongated direction of the long side frame members.

10. The fishing rod holder and wash-down station of claim 4, wherein each of the frame members and plurality of vertical rod holders are made of powder coated aluminum.

11. The fishing rod holder and wash-down station of claim 4, wherein at least one of the casters includes a brake.

12. The fishing rod holder and wash-down station of claim 4, wherein the plurality of vertical rod holders are arranged in first line along a first one of the long side frame members, and in a second line along a second one of the long side frame member.

13. The fishing rod holder and wash-down station of claim 12, wherein the vertical rod holders are spaced at least six inches apart.

* * * * *